US010914205B2

(12) United States Patent
Gurler

(10) Patent No.: US 10,914,205 B2
(45) Date of Patent: Feb. 9, 2021

(54) ROTATIONAL VALVE FOR TWO STROKE ENGINE

(71) Applicant: Onur Gurler, Rutherford, NJ (US)

(72) Inventor: Onur Gurler, Rutherford, NJ (US)

( * ) Notice: Subject to any disclaimer, the term of this patent is extended or adjusted under 35 U.S.C. 154(b) by 0 days.

(21) Appl. No.: 15/530,869

(22) Filed: Mar. 14, 2017

(65) Prior Publication Data

US 2018/0266336 A1    Sep. 20, 2018

(51) Int. Cl.

| | | |
|---|---|---|
| *F01L 7/12* | (2006.01) | |
| *F02D 41/00* | (2006.01) | |
| *F02D 13/02* | (2006.01) | |
| *F02B 25/18* | (2006.01) | |
| *F01L 5/06* | (2006.01) | |
| *F01L 5/20* | (2006.01) | |
| *F02B 75/02* | (2006.01) | |

(52) U.S. Cl.
CPC ............. *F01L 7/12* (2013.01); *F01L 5/06* (2013.01); *F01L 5/20* (2013.01); *F02B 25/18* (2013.01); *F02D 13/028* (2013.01); *F02D 41/0002* (2013.01); *F02B 2075/025* (2013.01); *F02D 2400/04* (2013.01); *Y02T 10/12* (2013.01)

(58) Field of Classification Search
CPC .... F02D 13/0215; F02D 41/26; F02D 13/028; F01L 7/12; F02B 75/02; F02B 2075/025
USPC ...... 123/41.4, 59.1, 59.2, 59.3, 59.4, 190.11, 123/190.12, 190.2, 190.1–190.9
See application file for complete search history.

(56) References Cited

U.S. PATENT DOCUMENTS

| | | | | |
|---|---|---|---|---|
| 2,720,872 A | * | 10/1955 | Motoaki ................. | F02B 25/00 123/65 V |
| 3,340,854 A | * | 9/1967 | Foster ..................... | F02B 25/00 123/257 |
| 3,945,364 A | * | 3/1976 | Cook ...................... | F01L 7/022 123/190.14 |
| 4,506,636 A | * | 3/1985 | Negre ...................... | F01L 7/12 123/190.2 |
| 4,966,104 A | * | 10/1990 | Hundleby ............. | F02D 13/028 123/65 BA |
| 4,987,864 A | * | 1/1991 | Cantrell ................. | F02B 29/06 123/190.2 |
| 5,062,396 A | * | 11/1991 | Duret ........................ | F01L 7/12 123/298 |
| 5,105,775 A | * | 4/1992 | Maissant ................. | F02B 25/26 123/70 R |
| 5,143,029 A | * | 9/1992 | Christenson ............. | F01L 7/12 123/188.5 |
| 5,197,434 A | * | 3/1993 | Contreras Orellana .. | F01L 1/28 123/190.4 |

(Continued)

FOREIGN PATENT DOCUMENTS

JP       04292510 A   * 10/1992

*Primary Examiner* — Mahmoud Gimie
(74) *Attorney, Agent, or Firm* — Ingenium Patents LLC; Peter R. Kramer

(57) ABSTRACT

A two stroke internal combustion engine having a piston reciprocating in a cylinder between TDC and BDC positions to influence a crank shaft with help of a connecting rod. A Rotational Valve (RV) associated with the cylinder body selectively altering the timing and duration of opening and closing of cylinder intake and exhaust ports. The said rotational Valve may be associated with the said crank shaft through a drive train assembly. Drive train assembly may control the Rotational Valve through electronic or mechanical means.

19 Claims, 4 Drawing Sheets

(56) References Cited

U.S. PATENT DOCUMENTS

| | | | | |
|---|---|---|---|---|
| 5,230,314 A * | 7/1993 | Kawahara | F01L 7/022 | 123/317 |
| 5,267,535 A * | 12/1993 | Luo | F01L 7/12 | 123/190.3 |
| 5,341,771 A * | 8/1994 | Riley | F02B 41/04 | 123/316 |
| 5,351,657 A * | 10/1994 | Buck | F01B 1/12 | 123/43 AA |
| 5,425,346 A * | 6/1995 | Mavinahally | F01L 7/12 | 123/568.13 |
| 5,448,971 A * | 9/1995 | Blundell | F02B 25/22 | 123/190.12 |
| 5,558,049 A * | 9/1996 | Dubose | F01L 7/028 | 123/190.14 |
| 5,738,051 A * | 4/1998 | Binversie | F01L 3/205 | 123/317 |
| 5,769,040 A * | 6/1998 | Christner | F02B 25/14 | 123/65 S |
| 5,771,849 A * | 6/1998 | Hamy | F01L 3/205 | 123/73 R |
| 5,791,304 A * | 8/1998 | Taipale | F02B 25/18 | 123/299 |
| 6,145,488 A * | 11/2000 | Plechner | F02B 25/14 | 123/193.1 |
| 6,237,556 B1 * | 5/2001 | Smith | F01L 7/025 | 123/190.8 |
| 6,263,841 B1 * | 7/2001 | Beveridge | F02B 25/24 | 123/65 A |
| 6,360,719 B1 * | 3/2002 | Uitenbroek | F02B 29/083 | 123/190.1 |
| 6,443,116 B1 * | 9/2002 | Dahlborg | F01L 7/02 | 123/190.2 |
| 6,595,177 B1 * | 7/2003 | Kramar | F01L 7/02 | 123/190.2 |
| 6,796,286 B1 * | 9/2004 | Rasmussen | F02B 33/12 | 123/318 |
| 8,210,136 B2 * | 7/2012 | Howard | F02B 33/10 | 123/42 |
| 2002/0134325 A1 * | 9/2002 | Tapia P | F01L 7/026 | 123/71 R |
| 2003/0051684 A1 * | 3/2003 | Laydera-Collins | F02B 17/00 | 123/73 AA |
| 2004/0035377 A1 * | 2/2004 | Arao | F02B 71/00 | 123/730 |
| 2004/0144361 A1 * | 7/2004 | Wallis | F01L 1/02 | 123/347 |
| 2005/0139179 A1 * | 6/2005 | Mavinahally | F01L 7/06 | 123/73 A |
| 2006/0124086 A1 * | 6/2006 | Fabrega | F02B 25/04 | 123/73 PP |
| 2010/0300417 A1 * | 12/2010 | Schouweiler, Jr. | F01L 1/38 | 123/661 |
| 2011/0030628 A1 * | 2/2011 | Main | F01L 7/023 | 123/41.82 R |
| 2011/0061637 A1 * | 3/2011 | Mavinahally | F02B 25/14 | 123/65 R |
| 2011/0203263 A1 * | 8/2011 | Veerathappa | F02D 19/10 | 60/299 |

\* cited by examiner

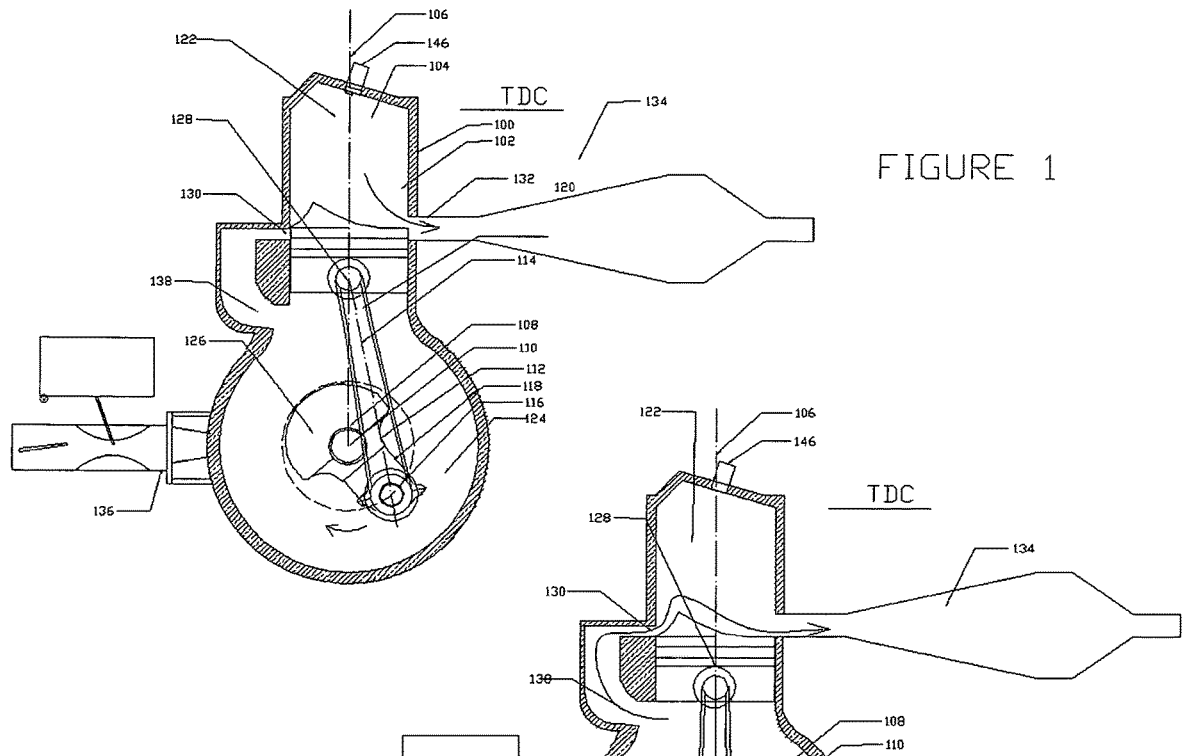
FIGURE 1
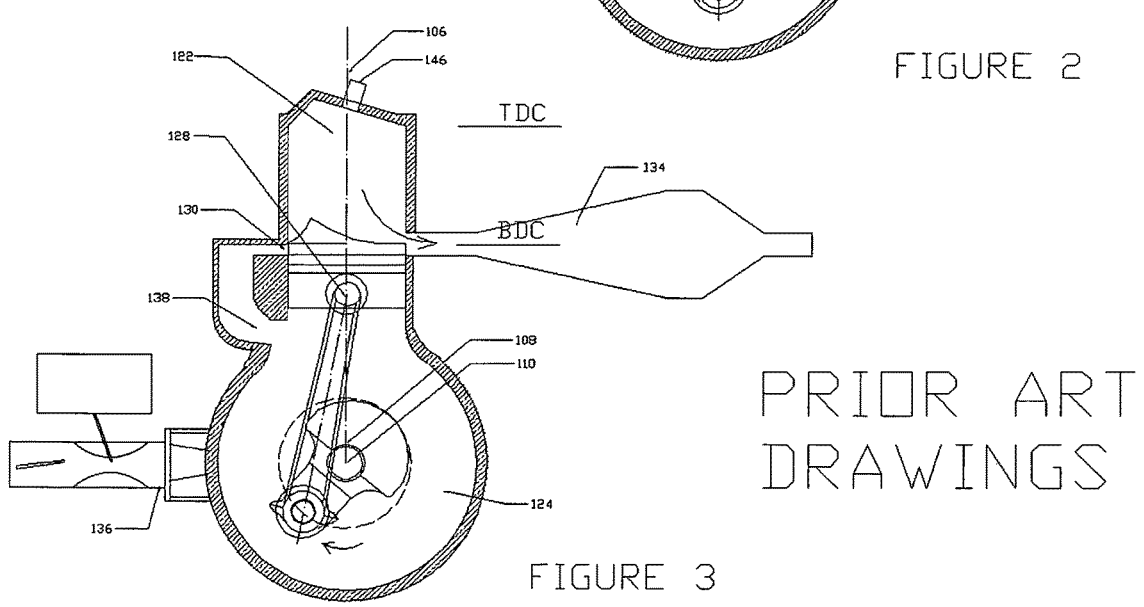
FIGURE 2
FIGURE 3
PRIOR ART DRAWINGS

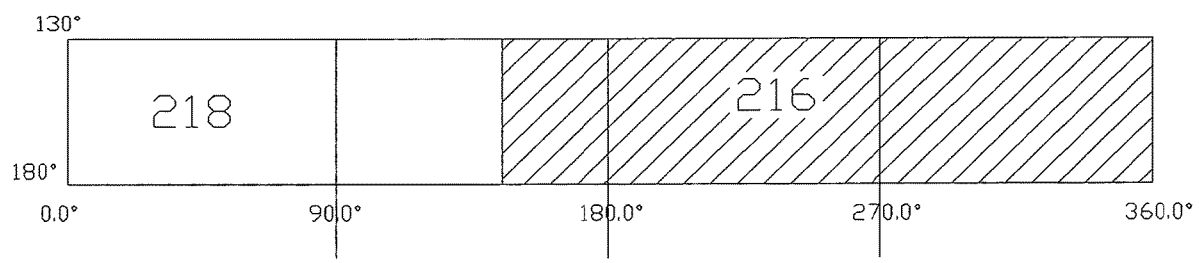
FIGURE 4 ROTATIONAL VALVE DEVELOPED VIEW

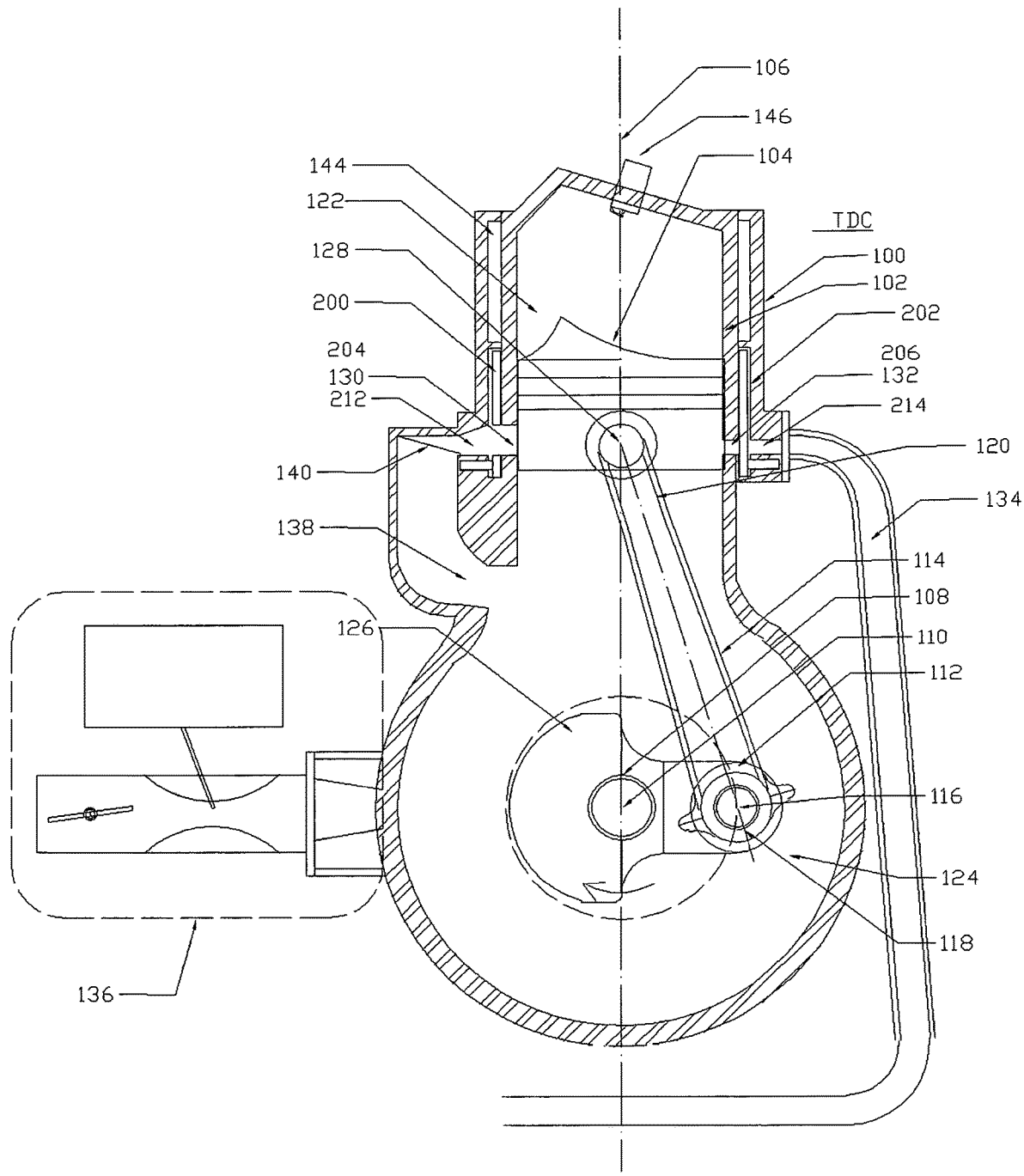
FIGURE 5 - ENGINE SECTION VIEW

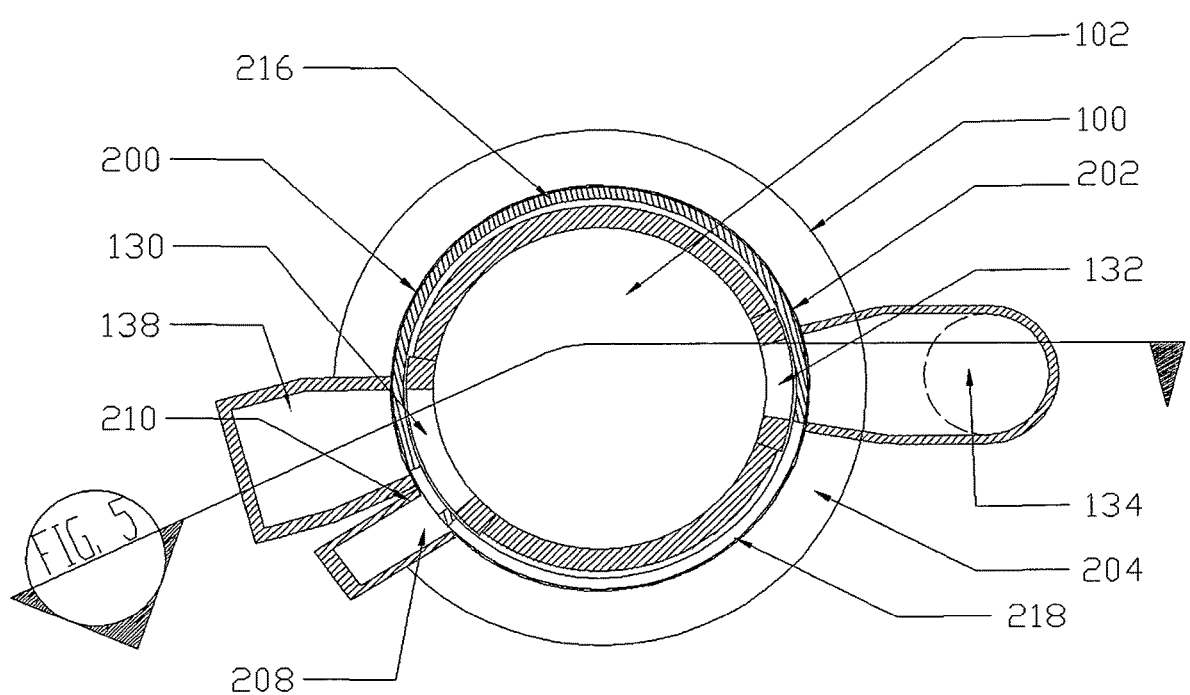
FIGURE 6 - ENGINE PLAN VIEW

ROTATIONAL VALVE FOR TWO STROKE ENGINE

BACKGROUND OF THE INVENTION

The present invention relates broadly to two-stroke internal combustion engines, and more particularly to an arrangement for controlling the intake and exhaust port opening durations with help of a Rotational Valve.

First two-stroke internal combustion engine was invented and patented in the 1881 by Scottish engineer Dugald Clerk and were first placed in practical use by Alfred Angas Scott. He started using two-stroke engines in twin cylinder water cooled motorcycles and the two-stroke engine industry was borne.

Two-stroke internal combustion engines complete a power cycle with two strokes, up and down movements of the piston during only one crankshaft revolution in comparison to four-stroke engines which complete a cycle in 4 piston strokes. In two-stroke engines, in between the end of the combustion stroke and the beginning of the compression stroke, exhaust and intake (or scavenging) functions occur at the same time.

A two-stroke engine performs intake, compression, combustion, and exhaust cycles in 2 strokes of the piston. The distance the piston travels between the Top Dead Center (TDC) and the Bottom Dead Center (BDC) positions is referred to as a stroke length.

During the combustion stroke of a two-stroke engine, the piston recedes from TDC to BDC, and at around 120 crank degree mark, the exhaust port is uncovered by the piston to let exhaust gases out of the cylinder. This is often referred as the exhaust cycle. As these gases are extremely hot and have high pressure, they rush out of the cylinder in a couple crank degrees. As the piston continues to .recede towards the BDC, the intake port is uncovered by the piston to permit air into the combustion chamber, which is mixed with an appropriate amount of gasoline through carburetor.

Two-stroke engine utilizes the bottom part of the piston to compress the attendant by utilizing the piston's natural reciprocating motion, and with help of the bottom part volume being built air tight. As the piston travels to TDC, it uncovers the intake port and connects the bottom part of the cylinder to the intake manifold, the carburetor and to the atmospheric pressure. Continued motion of the piston towards TDC creates a low pressure in the bottom part of the piston, relative to atmospheric pressure, and therefore induces the air-fuel mixture to flow into the bottom part of the piston. As the piston reaches the TDC a flip valve is closed, which renders the bottom part of the piston airtight. With help of the piston traveling towards BDC and decreasing this section's volume; the next combustion cycle's attendant naturally becomes compressed.

As the piston continues to recede towards BDC, it will uncover the intake port, which is connected to the bottom part of the cylinder; this will result in the compressed mixture of air & fuel to be rushed into the combustion chamber starting the intake-scavenging cycle. As the intake/scavenging cycle continues, continued flow of air & fuel mixture is sustained, which induces more air fuel mixture in the cylinder. The intake port is covered as the piston passes the BDC and starts traveling toward the TDC. Covering of the intake port stops the attendant from entering the combustion chamber, while some attendant is lost due to the exhaust port still being open at this point. As the piston travels closer to the TDC it covers the exhaust port and the piston compresses the mixture as it moves closer to TDC. This is referred as the compression cycle.

Combustion starts as the piston passes TDC in the third cycle in response to a spark produced by the spark plug. As the reaction starts, atom by atom the temperature and pressure of the mixture raises drastically. This is usually referred as the combustion cycle. Reaction takes place in a very fast manner, and it may be observed as an explosion. As the piston passes TDC a few drive shaft degrees, most of the fuel inside the chamber has been consumed and the highest temperature and pressure has been achieved. The attendant increase in volume as the piston moves toward BDC causes the gas to start losing its pressure while the crank shaft assembly keeps moving to a higher moment arm position. The pressure of the gas influences a moment to the drive shaft with the help of the piston and the connecting rod to produce power. As the piston again passes through 120 crank degree mark, the first cycle begins again.

There are some major differences between four-stroke and two-stroke engines. Four-stroke engines have poppet valves, which lets the air fuel mixture into the cylinder and exhaust gases out. It also has the valve train, springs, camshafts, and timing belts. In contrast two-stroke engines don't have any of these assemblies; in this engine type the number of moving parts are greatly reduced; hence two-stroke engines have high power to weight ratio, so can be compact and much lighter.

A four-stroke engine must be positioned in a certain way due to lubrication being collected in the bottom oil collection pan. This is not necessary for two-stroke engines, due to oil is mixed to the fuel and is used to lubricate moving parts. Burning the fuel along with the lubricating oil results in creating more exhaust emissions than four-stroke engines.

Advantages of two-stroke engines can be listed as light weight, simple operation, reduced number of moving parts, multiple ways of positioning the unit.

Disadvantages of two-stroke engines are listed as low efficiency due to less compression of the attendant, and high emissions in comparison to four-stroke engines. In addition, there is significant loss of fuel due to exhaust port being covered after the intake port is covered.

There are some prior arts to improve disadvantages of two-stroke engines, such as rotational exhaust valve closing the exhaust duct when the piston reaches the bottom dead center. This assembly ends scavenging cycle and stops loss of air-fuel mixture from the combustion chamber. This is a good way to improve efficiency in two-stroke engines, but this assembly required drive train and introduces more moving parts into a simple engine. Also, there is always room for improvement.

To manufacture an efficient two-stroke engine, one endeavors to use less fuel for a given power output. In comparison to prior art design and specifications, it would be advantageous to devise an engine keeping more attendant in the combustion chamber, having lower emissions, and thus having an increased torque while at the same time consuming less fuel.

BRIEF SUMMARY OF THE INVENTION

The present invention achieves this result and overcomes the shortcomings of the prior art by controlling the intake and exhaust port opening timing and durations with help of a rotational valve and its drive train. The rotational valve has an opening or openings which are timed to align with intake and exhaust ports thereby form ducts to conduct air-fuel mixture and exhaust gases in and out of the cylinder and therefore controlling the intake and exhaust port opening timing and durations.

BRIEF DESCRIPTION OF THE DRAWINGS

The subject matter regarded as the invention is particularly pointed out and distinctly claimed in the concluding portion of the specification. The invention, however, both as to organization and method of operation, together with the features, objects, and advantages thereof, may best be understood by reference to the following detailed description when read with the accompanying drawings in which:

FIG. 1 is a is a partial cross-sectional view of certain internal components of a conventional two-stroke engine at the exhaust port is uncovered;

FIG. 2 is a partial cross-sectional view of certain internal components of a conventional two-stroke engine in the BDC position;

FIG. 3 is a is a partial cross-sectional view of certain internal components of a conventional two-stroke engine in the intake port is covered position;

FIG. 4 is a is a developed view of the rotational valve and associated components in accordance with one embodiment of the present invention, FIG. 5 is a is a partial schematic cross-sectional view of an exemplary two-stroke engine in the intake port is covered position;

FIG. 6 is a schematic cross-sectional view of an exemplary two-stroke engine from the top down.

DETAILED DESCRIPTION

In the following are described the preferred embodiments of the rotational valve for two stroke engine in accordance with the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

Referring to the drawings, and prior to addressing the preferred embodiments of the invention, reference is drawn to FIG. 1 which depicts a partial cross-sectional view of certain components of a conventional engine, such as a two stroke gasoline engine. As shown, the engine comprises an engine block 100 within which a cylinder 102 is cast or otherwise provided. The cylinder 102 houses a piston 104 which travels in a reciprocating manner along a centerline 106 of the cylinder 102. Of course, although shown in a generally vertical orientation in FIG. 1, it is well known that the cylinder 102 may be canted toward one side or the other depending on the application. For example, in a typical automobile application of a V-style engine, such as a V-6, banks of cylinders may be canted outwardly relative to each other. A crank shaft assembly 112 is mounted below the cylinder 102 in the conventional engine shown in FIG. 1.

The crank shaft assembly 112 generally includes a drive shaft 108, which in the view of FIG. 1 is shown to extend into and out of the view along a drive shaft axis 110. As the drive shaft 108 rotates about the drive shaft axis 110, which for purposes of this disclosure will be represented in a clockwise orientation, the connecting rod pin 116 also rotates, typically in a circular manner. This rotation drives a connecting rod 114 which is pivotally connected at a first end 118 to the drive shaft 108 and at a second end 120 to the piston 104. These connections are generally made through pins, 116, 128. As a result of the linkage of the connecting rod 114 to the piston connecting rod pin 116, rotational movement of the drive shaft 108 is converted to linear movement, driving the piston between its TDC position, where it is farthest from the drive shaft 108, and its BDC position, where it is closest to the drive shaft.

The cylinder 102 housing the piston 104 has one end where the combustion occurs is the combustion chamber 122 and the other end is the bottom part of the cylinder 124.

Many conventional engines also include counter-weights 126 mounted to the drive shaft 110 in such a manner as to offset the imbalance which would otherwise be created by the offset connection of the connecting rod 114 to the connecting rod pin 116.

2 stoke engines do not have poppet valves, the attendant is fed and exhaust gases are removed from the combustion chamber 122 by the piston covering or uncovering intake 130 and exhaust ports 132, as seen in FIG. 1. Said ports are carved or otherwise located in the Engine block 100. Intake port 130 is connected to a means of fuel feeding apparatus; a carburetor 136 as seen in FIG. 1, or a fuel injector and therefore feed the attendant into the combustion chamber 122. Exhaust port 132 connects the combustion chamber 122 to exhaust pipe 134; therefore removing high pressure gases from the combustion chamber 122 through this pipe.

The present invention contemplates altering the timing and opening durations of intake 204 (while referring to FIG. 6) and exhaust 206 ducts through a rotational valve 200 rotating about the cylinder axis 106 located in its dedicated interstitial space 202. The rotational valve 200 is solid with openings carved within, may be rotating at the same or different angular speed with the drive shaft 108, aligning its opening or openings with intake port 130 and outer intake port 212; therefore forming an intake duct 204 and let the attendant into the combustion chamber 122; and otherwise aligning its opening or openings with exhaust port 132 and outer exhaust port 214; therefore forming an exhaust duct 206 and let the exhaust gases out of the combustion chamber 122.

The present invention provides the ability to do so. As shown in FIG. 6, the rotational valve openings are associated with the intake and exhaust ducts in such a way to stop the attendant loss during intake stroke, and selectively lengthen attendant intake duration during intake stroke.

Still referring to FIG. 6, there is drive train associated with the rotational valve 200 in such a way to help rotational valve 200 to perform altering the timing and opening durations of intake 204 and exhaust 206 ducts. This drive train may be gear, belt or otherwise driven.

There is the bottom part of cylinder 124 (FIG. 6) may be airtight and therefore may be used to promote scavenging cycle of the combustion chamber through embodiments; transfer port 138, flipper valve 140 and the piston 104 uncovering intake port 130 and selectively directing the air that is compressed in the bottom part of the cylinder 124, into the combustion chamber 122 by help of the rotational valve 200.

Cross Reference to Related Applications

| Cited Patent | Filing Date | Publication Date | Applicant | Title |
| --- | --- | --- | --- | --- |
| U.S. Pat. No. 5,267,535 A | Aug. 22, 1990 | Dec. 7, 1993 | Jih-Tzang Luo | Rotary exhaust valve for two-stroke engine |
| U.S. Pat. No. 4,920,745 A | Aug. 11, 1987 | May 1, 1990 | Wayne Ross Gilbert | Two-stroke engine variable tuned exhaust system |
| U.S. Pat. No. 4,924,819 A ABSTRACT | May 15, 1989 | May 15, 1990 | Eyvind Boyesen | Rotary exhaust control valve for two-stroke cycle engines and process for using the same |
| U.S. Pat. No. 4,321,893 A | Aug. 13, 1980 | Mar. 30, 1982 | Masahiro Yamamoto | Two-stroke engine having variable exhaust port timing |
| U.S. Pat. No. 4,370,959 A | May 30, 1980 | Feb. 1, 1983 | Robert J. McNair, Jr. | Two stroke cycle engine with sustained power stroke |
| U.S. Pat. No. 2,639,699 | 1 Sep. 1951 | 26 May 1953 | Elmer C Kiekhaefer | Two-cycle engine and improved crankcase induction means therefor |
| U.S. Pat. No. 2,768,616 | 25 Oct. 1951 | 30 Oct. 1956 | Thomas B Danckwortt | Two cycle opposed piston internal combustion engine |
| U.S. Pat. No. 3,257,997 | 4 Feb. 1965 | 28 Jun. 1966 | Mcculloch Corp | Piston for internal combustion engine |
| U.S. Pat. No. 3,257,998 | 4 Feb. 1965 | 28 Jun. 1966 | Mcculloch Corp | Cylinder for internal combustion engine |
| U.S. Pat. No. 3,797,467 | 9 Feb. 1972 | 19 Mar. 1974 | W Tenney | Two cycle engine scavenge ports |
| U.S. Pat. No. 3,805,750 | 10 Mar. 1972 | 23 Apr. 1974 | Tenney W | Two cycle engine with auxiliary exhaust ports |
| U.S. Pat. No. 3,905,340 | 29 Jun. 1973 | 16 Sep. 1975 | Performance Industries | Engine valving and porting |
| U.S. Pat. No. 4,000,723 | 15 Nov. 1973 | 4 Jan. 1977 | Performance Industries, Inc. | Engine valve means and porting |
| U.S. Pat. No. 4,066,050 | 18 Dec. 1975 | 3 Jan. 1978 | Ricardo & Co., Engineers (1927) Limited | Two-stroke I.C. engines |
| U.S. Pat. No. 4,135,479 | 16 Dec. 1976 | 23 Jan. 1979 | Karl Schmidt Gmbh | Piston and cylinder for two-cycle engines |
| U.S. Pat. No. 4,202,299 | 10 Oct. 1978 | 13 May 1980 | Performance Industries, Inc. | Two cycle internal combustion engine |
| U.S. Pat. No. 4,352,343 | 21 Jul. 1980 | 5 Oct. 1982 | Piaggio & C. S.P.A. | Constructional improvements in a two-stroke opposed piston engine operating with stratified charge |
| U.S. Pat. No. 4,353,333 | 30 Jun. 1980 | 12 Oct. 1982 | Yamaha Hatsudoki Kabushiki Kaisha | Two cycle engine with augmented intake ports |
| U.S. Pat. No. 4,373,475 | 18 Dec. 1980 | 15 Feb. 1983 | Outboard Marine Corporation | Internal combustion engine |
| U.S. Pat. No. 4,383,503 | 12 Jun. 1981 | 17 May 1983 | Brunswick Corporation | Combustion chamber scavenging system |
| U.S. Pat. No. 4,655,175 | 27 Jan. 1986 | 7 Apr. 1987 | General Electric Company | Steam purge of a piston/cylinder gap in a diesel engine |
| U.S. Pat. No. 4,809,648 | 25 May 1988 | 7 Mar. 1989 | Industrial Technology Research Institute | Two-stroke engine having a central scavenging system |
| U.S. Pat. No. 4,821,687 | 31 Jul. 1987 | 18 Apr. 1989 | Sanshin Kogyo Kabushiki Kaisha | Two-stroke engine |
| U.S. Pat. No. 6,279,521 | 10 Dec. 1999 | 28 Aug. 2001 | Tanaka Kogyo Co., Ltd. | Two-cycle engine |
| U.S. Pat. No. 6,408,805 | 12 Apr. 2001 | 25 Jun. 2002 | Mitsubishi Heavy Industries, Ltd. | Two-stroke cycle engine |
| U.S. Pat. No. 6,539,900 | 19 Jun. 2002 | 1 Apr. 2003 | Avl List Gmbh | Two-stroke internal combustion engine with crankcase scavenging |
| U.S. Pat. No. 6,662,765 | 18 Mar. 2002 | 16 Dec. 2003 | Kioritz Corporation | Two-stroke internal combustion engine |
| U.S. Pat. No. 6,691,649 | 18 Jul. 2001 | 17 Feb. 2004 | Bombardier-Rotax Gmbh | Fuel injection system for a two-stroke engine |
| U.S. Pat. No. 7,013,850 | 29 Apr. 2004 | 21 Mar. 2006 | Andreas Stihl Ag & Co. Kg | Two-stroke engine |
| U.S. Pat. No. 7,255,072 | 23 May 2006 | 14 Aug. 2007 | Kioritz Corporation | Two-stroke internal combustion engine |
| U.S. Pat. No. 7,258,087 | 3 Mar. 2006 | 21 Aug. 2007 | Cameron International Corporation | Air intake porting for a two stroke engine |
| U.S. Pat. No. 7,363,888 | 13 Jan. 2006 | 29 Apr. 2008 | Andreas Stihl Ag & Co. Kg | Two-stroke engine |
| U.S. Pat. No. 7,578,268 | 17 Jul. 2007 | 25 Aug. 2009 | Cameron International Corporation | Air intake porting for a two stroke engine |
| U.S. Pat. No. 7,784,437 | 24 Jul. 2009 | 31 Aug. 2010 | Cameron International Corporation | Air intake porting for a two stroke engine |

-continued

| Cited Patent | Filing Date | Publication Date | Applicant | Title |
| --- | --- | --- | --- | --- |
| U.S. Pat. No. 7,963,258 | 26 Jul. 2010 | 21 Jun. 2011 | Cameron International Corporation | Air intake porting for a two stroke engine |
| U.S. Pat. No. 8,104,438 | 24 Feb. 2011 | 31 Jan. 2012 | Cameron International Corporation | Air intake porting for a two stroke engine |
| U.S. Pat. No. 8,235,010 | 9 Jun. 2011 | 7 Aug. 2012 | Cameron International Corporation | Air intake porting for a two stroke engine |
| US20030075124 | 10 Oct. 2002 | 24 Apr. 2003 | Haman David F. | Method and apparatus for dissipating heat from a combustion chamber of an internal combustion engine |
| US20030217710 | 15 May 2003 | 27 Nov. 2003 | Andreas Stihl Ag & Co. Kg | Two-cycle engine |
| US20040168656 | 11 May 2001 | 2 Sep. 2004 | Bo Carlsson | Crankcase scavenged internal combustion engine |
| US20050022757 | 27 Jul. 2004 | 3 Feb. 2005 | Kioritz Corporation | Two-stroke internal combustion engine |
| US20060278183 | 18 Aug. 2006 | 14 Dec. 2006 | Mavinahally Nagesh S | Stratified scavenged two-stroke engine |
| US20100059030 | 21 Jun. 2007 | 11 Mar. 2010 | Shigetoshi Ishida | Stratified Scavenging Two-Cycle Engine |
| US20100288253 | 26 Jul. 2010 | 18 Nov. 2010 | Cameron International Corporation | Air intake porting for a two stroke engine |
| US20110232599 | 9 Jun. 2011 | 29 Sep. 2011 | Cameron International Corporation | Air intake porting for a two stroke engine |
| US20110247601 | 6 Apr. 2011 | 13 Oct. 2011 | Imack Laydera-Collins | Two-cycle engine and low emission control system |
| EP1988270A1 * | 25 Mar. 2008 | 5 Nov. 2008 | KTM Sportmotorcycle AG | Two-stroke internal combustion engine |
| U.S. Pat. No. 6,244,227 | 4 Dec. 1998 | 12 Jun. 2001 | Bombardier Inc. | Valve assembly using pressurized medium for controlling operating conditions of a two-stroke engine |
| U.S. Pat. No. 6,273,036 * | 31 Mar. 2000 | 14 Aug. 2001 | Honda Giken Kogyo Kabushiki Kaisha | Exhaust control valve assembly for an engine |
| U.S. Pat. No. 7,484,482 | 22 Jan. 2007 | 3 Feb. 2009 | Brp-Rotax Gmbh & Co. Kg | Valve assembly for a two-stroke engine |
| US20020002958 * | 6 Jun. 2001 | 10 Jan. 2002 | Hiroyuki Uchida | Exhaust control system in two-cycle internal combustion engine |
| US20050166872 * | 31 Jan. 2005 | 4 Aug. 2005 | Brp-Rotax Gmbh & Co. Kg | Exhaust-outlet control for 2-stroke engien |
| US20070186882 * | 1 Nov. 2004 | 16 Aug. 2007 | Brp-Rotax Gmbh & Co. Kg | Exhaust control valve for internal combustion engine |
| U.S. Pat. No. 4,998,512 * | 26 Jan. 1990 | 12 Mar. 1991 | Yamaha Hatsudoki Kabushiki Kaisha | Exhaust port control system for two stroke engine |
| U.S. Pat. No. 5,000,131 * | 26 Jan. 1990 | 19 Mar. 1991 | Yamaha Hatsudoki Kabushiki Kaisha | Exhaust port control valve for two stroke engine |
| U.S. Pat. No. 5,063,887 * | 13 Aug. 1990 | 12 Nov. 1991 | Yamaha Hatsudoki Kabushiki Kaisha | Exhaust control valve system for parallel multi-cylinder two-cycle engine |
| U.S. Pat. No. 5,063,888 * | 13 Aug. 1990 | 12 Nov. 1991 | Yamaha Hatsudoki Kabushiki Kaisha | Exhaust control valve system for parallel multi-cylinder. two-cycle engine |
| U.S. Pat. No. 5,220,890 * | 16 Oct. 1991 | 22 Jun. 1993 | Yamaha Hatsudoki Kabushiki Kaisha | Variable compression device for two cycle diesel engine |
| U.S. Pat. No. 5,373,816 * | 7 Jan. 1994 | 20 Dec. 1994 | Honda Giken Kogyo Kabushiki Kaisha | Exhaust control device for a two motor cycle engine |
| U.S. Pat. No. 5,537,958 * | 3 Feb. 1995 | 23 Jul. 1996 | Sanshin Kogyo Kabushiki Kaisha | Variable compression ratio system for two-cycle engine |
| U.S. Pat. No. 5,598,813 * | 9 Jun. 1994 | 4 Feb. 1997 | Yamaha Hatsudoki Kabushiki Kaisha | Internal combustion engine with exhaust control device |
| U.S. Pat. No. 5,605,119 * | 30 Jan. 1995 | 25 Feb. 1997 | Yamaha Hatsudoki Kabushiki Kaisha | Exhaust control valve for engine |

I claim:

1. A two stroke internal combustion engine, having an intake port, an exhaust ports, and a rotational valve for controlling the timing of intake and exhaust ports, comprising:

an engine block forming at least one cylinder with a central axis;

a piston adapted to reciprocate linearly within said at least one cylinder along said central axis between a top dead center position and a bottom dead center position;

a crank shaft assembly mounted within said engine block, said crank shaft assembly including a drive shaft with a drive shaft axis and an eccentric connecting rod pin with a pin axis whose axis to be different from drive shaft axis;

the intake port positioned and adapted to permit ingress of air and fuel mixture into said cylinder and the exhaust port positioned and adapted to permit egress of exhaust gases from said cylinder;

an upper section of the cylinder, which is separated by a reciprocating piston to accommodate a spark plug to ignite the air & fuel mixture and perform the combustion stage;

an airtight bottom section of the cylinder, wherein the cylinder is separated by the piston;

a transfer port is adapted into the cylinder block to let compressed air in the bottom section of the cylinder to the top section of the cylinder; and a rotational valve, adapted to prevent loss of air-fuel mixture, comprises a body, said rotational valve further comprises an opening on said body;

wherein said rotational valve is configured as an elongated ring positioned in a dedicated interstitial space between the engine block and cylinder housing (102), said elongated ring further positioned at Bottom Dead Center between the ports and a combustion chamber, and wherein said rotational valve rotates about a cylinder axis at variable angular speed continuously in about 360°, and wherein said rotational valve is further configured to transiently align with the intake port to permit ingress of a mixture of fuel and air into the cylinder during intake cycle, and wherein said rotational valve is further configured to transiently align with the exhaust port to permit egress of exhaust gases from the cylinder, thereby controlling the intake and exhaust port opening timing and durations.

2. The engine of claim 1, wherein the rotational valve rotates about an axis of rotation, and further wherein the cylinder axis is either parallel to the rotational valve axis or is within a specified distance of the rotational valveaxis.

3. The engine of claim 1, wherein the rotational valve is configured to have a circular shape when viewed in plan view.

4. The engine of claim 1 configured wherein timing of alignment of the rotational valve opening or openings and the exhaust port is variable and can occur at any time during the crankshaft rotation.

5. The engine of claim 1 configured wherein timing of alignment of the rotational valve opening or openings and the intake port is variable and can occur at any time during the crankshaft rotation.

6. The engine of claim 1, further comprising a means for transfer of rotational motion to the rotational valve.

7. The engine of claim 1, said engine configured wherein the rotation timing of the rotational valve to align opening with the exhaust port can be adjusted while rotating to any time shift or angle.

8. The engine of claim 1, said engine configured wherein the rotation timing of the rotational valve to align opening with the intake port can be adjusted while rotating to any time shift or angle.

9. The engine of claim 1, said engine configured wherein the rotational valve speed and position sensing is controlled by either mechanical or electronic means.

10. The engine of claim 1, wherein adjusting the timing, rotation and speed of the rotational valve is achieved in real time with help of a computer.

11. The engine of claim 1, wherein the rotational valve either rotates clockwise or counterclockwise may rotate clockwise or counter clockwise.

12. The engine of claim 1, wherein said engine is configured so that the junction of the rotational valve opening and the intake and exhaust ports will either leak into an interstitial space or will not leak into the interstitial space.

13. The engine of claim 1, wherein the rotational valve has a port to let compressed air in the bottom section of the cylinder into the upper section.

14. The engine of claim 1 wherein said rotational valve is controlled by a drive train assembly.

15. The engine of claim 2, wherein said rotational valve has a single opening on said rotational valve body.

16. The engine of claim 15, wherein said rotational valve is further adapted to be controlled by a drive train assembly.

17. A rotational valve, said rotational valve adapted for use in a two stroke internal combustion engine having an intake port, an exhaust port, a cylinder and an engine block, the rotational valve adapted for controlling the timing of the intake and exhaust ports, said rotational valve comprising, a body, an opening, said body having said opening, said rotational valve configured as an elongated ring adapted to be positioned outside the cylinder in a dedicated interstitial space, said rotational valve further adapted to be positioned at Bottom Dead Center between the intake and exhaust ports and a combustion chamber, wherein said rotational valve is yet further adapted to rotate about a cylinder axis of the engine at variable angular speed continuously in about $360^2$, and wherein said opening of said rotational valve is configured to transiently align with the exhaust port to permit egress of exhaust gases from the cylinder, thereby controlling the intake and exhaust port opening timing and durations.

18. The rotational valve of claim 17, wherein said rotational valve has a single opening on said rotational valve body.

19. The rotational valve of claim 18, wherein said rotational valve is further adapted to be controlled by a drive train assembly.

* * * * *